(12) United States Patent
Okun et al.

(10) Patent No.: US 7,254,750 B1
(45) Date of Patent: Aug. 7, 2007

(54) HEALTH TREND ANALYSIS METHOD ON UTILIZATION OF NETWORK RESOURCES

(75) Inventors: Justin Azriel Okun, Lake Forest, CA (US); Patricia Lynn Maw, Rancho Santa Margarita, CA (US)

(73) Assignee: Unisys Corporation, Blue Bell, PA (US)

( * ) Notice: Subject to any disclaimer, the term of this patent is extended or adjusted under 35 U.S.C. 154(b) by 597 days.

(21) Appl. No.: 10/812,688

(22) Filed: Mar. 30, 2004

(51) Int. Cl.
*G06F 11/00* (2006.01)

(52) U.S. Cl. .................................................. 714/47
(58) Field of Classification Search ............... 714/47; 702/179, 180
See application file for complete search history.

(56) References Cited

U.S. PATENT DOCUMENTS

| | | | |
|---|---|---|---|
| 4,881,230 A | 11/1989 | Clark et al. | |
| 5,623,598 A * | 4/1997 | Voigt et al. | 714/47 |
| 6,023,507 A | 2/2000 | Wookey | |
| 6,076,174 A * | 6/2000 | Freund | 714/47 |
| 6,154,128 A | 11/2000 | Wookey et al. | |
| 6,182,249 B1 | 1/2001 | Wookey et al. | |
| 6,237,114 B1 | 5/2001 | Wookey et al. | |
| 6,263,452 B1 | 7/2001 | Jewett et al. | |
| 6,550,017 B1 | 4/2003 | Moiin et al. | |
| 6,629,266 B1 * | 9/2003 | Harper et al. | 714/38 |
| 7,089,459 B2 * | 8/2006 | Therien | 714/47 |
| 7,127,371 B2 * | 10/2006 | Duckert et al. | 702/179 |
| 7,131,032 B2 * | 10/2006 | Gibson et al. | 714/26 |

* cited by examiner

*Primary Examiner*—Scott Baderman
*Assistant Examiner*—Tim Bonura
(74) *Attorney, Agent, or Firm*—Alfred W. Kozak; Charles A. Johnson; Beth L. McMahon

(57) ABSTRACT

An embodiment of the present invention is a method for monitoring various data sources for events indicative of a current or potential system health problem, thereby detecting positive or negative trends in system health data. At the core of this module is an algorithm that analyzes a series of data points that have been collected into sample sets over time.

8 Claims, 8 Drawing Sheets

HEALTH TREND ANALYSIS METHOD ON UTILIZATION OF NETWORK RESOURCES

CROSS-REFERENCES TO RELATED CASES

This application is related to a co-pending application U.S. Ser. No. 10/731,045 entitled "Method For Health Monitoring With Predictive Health Service In A Multiprocessor System", which is incorporated herein by reference.

BACKGROUND OF THE INVENTION

1. Field of the Invention

The present invention generally relates to a utility service that automates management of system health-operations in monitoring, prediction, and notifications and provides the ability to correct system health issues in a digital environment, while including a trend analysis module that uses the data from several of the monitored metrics to calculate the length of time to a potential future failure. These long-term trend warnings and other warnings are based on shorter-term data which provide a degree of "predictive" warning of potential problems, a feature that was previously absent in multiprocessor systems.

2. Description of Related Art

Monitoring the health of complex multi-processor systems is a difficult and time-consuming task. Human operators must know where and how frequently to check for problem conditions and how to react to correct them when found. Recognizing the signs of a possible future problem so that it can be avoided altogether is even more difficult and is not a task that is performed with any consistency across customer sites. Earlier releases of the Unisys Server Sentinel software suite attempted to address these issues for Unisys ES7000 systems through a set of approximately 20 knowledge scripts provided with the Server Director product. Although these scripts provided automated monitoring for predetermined alert conditions, each script had to be separately configured and deployed by technical staff at each customer site. The conditions being monitored were generally only things that could be expressed very simply (such as simple threshold violations), and the script set provided little in the way of predictive monitoring.

The Unisys HealthMonitor service automates management of system health monitoring, prediction, and notification, and provides the ability to correct system health issues in the Server Sentinel environment. The portion of that solution of interest here is a trend analysis module that uses the data from several of the monitored metrics to calculate the length of time to a potential future failure; these long-term trend warnings and other warnings based on shorter-term data provide a degree of "predictive" warning of potential problems that are likely to appear.

One related art method to which the method of the present invention generally relates is described in U.S. Pat. No. 4,881,230 entitled "Expert System For Processing Errors In A Multiplex Communications System". This prior related art method is a method and apparatus for detecting and analyzing errors in a communications system. The method employs expert system techniques to isolate failures to specific field replaceable units and provide detailed messages to guide an operator to a solution. The expert system techniques include detailed decision trees designed for each resource in the system. The decision trees also filter extraneous sources of errors from affecting the error analysis results.

The present invention differs from the above related cited art in that the prior invention deals specifically with a "communications system", not a general-purpose computer system. The cited prior reference targets actual failures of field replaceable hardware units, whereas the present invention will detect and present warning conditions that predict failure (as well as failures that have already occurred) and is capable of monitoring software as well as hardware.

Yet another related art method to which the method of the present invention generally relates is described in U.S. Pat. No. 6,263,452 entitled "Fault-Tolerant Computer System With Online Recovery And Reintegration Of Redundant Components". This prior related art method involves a computer system in a fault-tolerant configuration which employs multiple identical CPUs executing the same instruction stream, with multiple, identical memory modules in the address space of the CPUs storing duplicates of the same data. The system detects faults in the CPUs and memory modules, and places a faulty unit offline while continuing to operate using the good units. The faulty unit can be replaced and reintegrated into the system without shutdown. The multiple CPUs are loosely synchronized, as by detecting events such as memory references and stalling any CPU ahead of others until all execute the function simultaneously; interrupts can be synchronized by ensuring that all CPUs implement the interrupt at the same point in their instruction stream. Memory references via the separate CPU-to-memory busses are voted at the three separate ports of each of the memory modules. I/O functions are implemented using two identical I/O busses, each of which is separately coupled to only one of the memory modules. A number of I/O processors are coupled to both I/O busses. I/O devices are accessed through a pair of identical (redundant) I/O processors, but only one is designated to actively control a given device; in case of failure of one I/O processor, however, an I/O device can be accessed by the other one without system shutdown.

The present invention differs from this related art in that the cited prior art focuses on a method that deals with a fault-tolerant configuration of redundant CPUs. The method of the present invention is not limited to hardware and is concerned with reporting hardware and software problems rather than automatically swapping out bad hardware components.

Another related art method to which the method of the present invention generally relates is described in U.S. Pat. No. 6,237,114 entitled "System And Method. For Evaluating Monitored Computer Systems". This prior related art method is a computer system used in monitoring another computer system and provides both textual resolution information describing a likely solution for a problem encountered in the monitored computer system as well as component information that relates to the particular problem. The component information includes the various hardware, software and operating conditions found in the monitored computer system. The monitoring computer system determines if a condition of a predetermined severity exists in the monitored computer system according to diagnostic information provided from the monitored computer system. The diagnostic information is represented in the monitoring computer system as a hierarchical representation of the monitored computer system. The hierarchical representation provides present state information indicating the state of hardware and software components and operating conditions of the monitored computer system. The resolution information relating to the condition is retrieved from a resolution database and relevant component information is retrieved from the hierarchical representation of the computer system and presented to a support engineer to assist them in diagnosing the problem in the monitored computer system.

The present invention differs from this related art in that the cited prior art focuses on a system for describing a problem found on a monitored system and advises the user of possible resolutions. The method of the present invention does not attempt to advise the user as it is more concerned with detecting and reporting failures and bad data trends that may indicate potential future failures. Many of these conditions are self-explanatory. This cited art seems to appear like this is a distributed application and the monitoring system is responsible for determining if a problem condition is present. However, in the present invention, all monitoring is performed locally and is tailored to use a set of special monitoring policies that apply only to the local system.

BRIEF SUMMARY OF THE INVENTION

It is therefore a method of the present invention to provide in a multiprocessor system, the ability to monitor and respond to a flexible set of conditions; adding and removing conditions as needed; the ability to provide an estimated time to failure for certain resources; the ability to collect violated conditions for processing by a separate script or program. Those features provided by the service are shown, in exemplary form, to operate in the Windows .NET environment. Features provided by the HealthEvents.dll (data link library) can be used from any CON (Component Object Model)-capable scripting or programming language running in a Windows NT-like environment (NT, Windows 2000, Windows XP, Windows .NET). A Server Director script, as written, functions only in the Unisys Server Director or NetIQ AppManager environment, but can be modified to work in any Windows scripting environment.

The method of the HealthMonitor Service loads up the HealthEvents Data Link Library so that the client can create a HealthEvents Object or a PredictiveEvents Object. This "Local Object" (the HealthEvents or PredictiveEvents object created in the client's local programming environment) is connected to a Collection of Global HealthEvents or PredictiveEvents after which there is a return of individual Violation Events to the client.

At start up, the PredictiveEvents and HealthEvents Collections are processed against a set of pre-determined policies (P), which determines what to monitor, how often to monitor, and what action to take if a policy is violated. Queries are made to check if the selected policy (P) does monitoring of long-term trends which may involve a Violation Event. Likewise this is done for Predictive Data also. Some policies are concerned with an increasing or upward trend in the monitored metric; for example, an increase in the number of processes queued for execution by a processor may indicate that a currently-executing process is using more than its fair share of processor resources. Other policies monitor other metrics for decreasing or downward trends; for instance, a decrease in the amount of available disk space on the system may signal future difficulties for programs that need to write to the disk.

Each Provider (a source of Health Monitoring data, such as a Windows Event Log) is checked to see if it is currently available. Then the Provider is checked against any policy P applicable to that Provider with the final result of returning information about any policy violation by the selected provider. Then corrective action can be instituted by the HealthMonitor service and HealthEvents objects via the User Client Application or script of item 712 of FIG. 8.

A predictive trending algorithm is provided with information for handling a particular health trend policy. For example this might involve a "memory leak policy". The method analyzes a single sample set. Control in the method is then passed to a different piece of the algorithm for a more detailed analysis based on the earlier summary and the nature of the health policy whereby the method looks for either an upward or for a downward trend.

The method then determines whether the last 10 sample sets have indicated that there is no significant trend in the data that is monitored. If this is the case, the algorithm is reset to its starting state and then begins collecting fresh data as was done previously. Otherwise, the last 10 sample sets are used to see if there is a significant trend in the direction required by the policy concerned with this particular data. If this is the case, this trend is brought to the user's attention and the algorithm is reset to its starting state.

If the last 10 sample sets do not clearly indicate a trend in the desired direction, the method smoothes the data for correction when monitoring for an trend by using reported values above the upper limit of the selected policy to offset any reported values below the lower limit. By virtue of the smoothing, the process adjusts for temporary spikes in the monitored data and helps to eliminate false alerts. This methodology applies whether monitoring for an upward or a downward trend.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

GLOSSARY ITEMS

Figure 1:
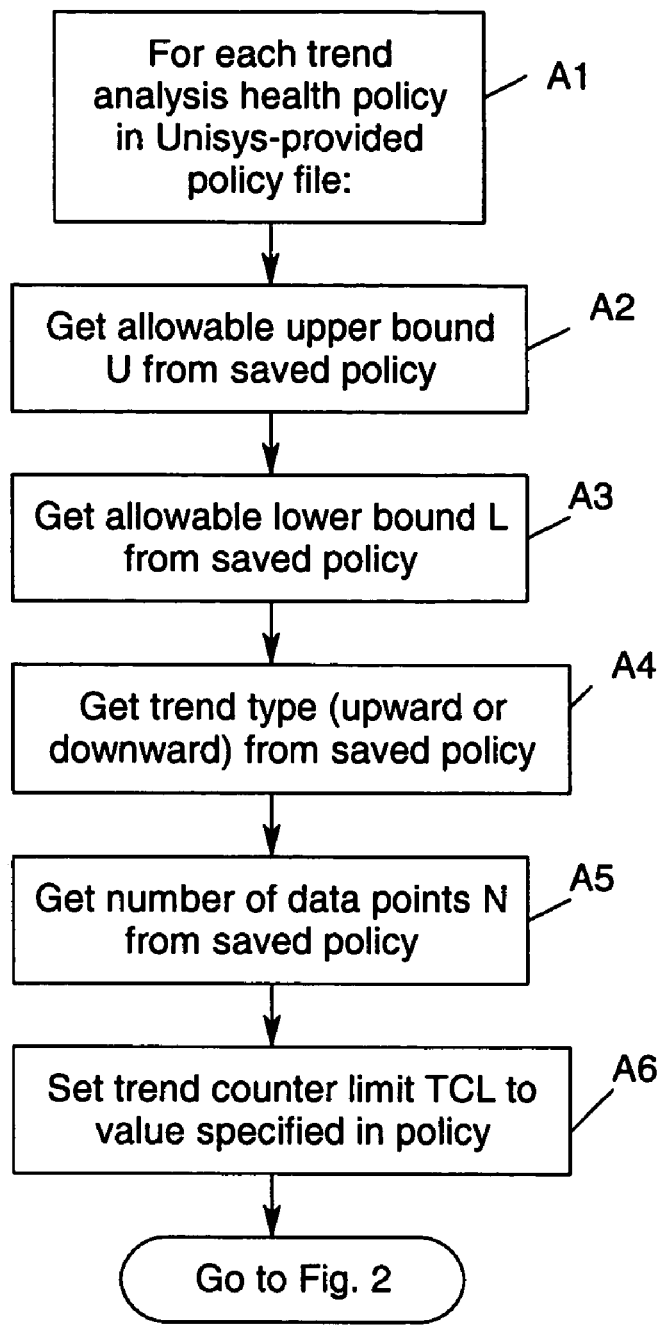
FIG. 1 is a flowchart which illustrates the general process of the trend analysis health policy.

1. Unisys Server Director: a component of the Sentinel Software suite that facilitates management of the platform and operating environment using a drag-and-drop user interface to deploy any of a number of ready-to-use Server Director scripts. Server Director is based on the NetIQ AppManager product.
2. Server Director Scripts: scripts deployed using the Server Director product that monitor and report or monitor and react to various conditions in the platform or operating environment. The scripts are written in a variant of Extended Basic for Scripting that is recognized by the script interpreter code Unisys has licensed from NetIQ.
3. Server Sentinel: A suite of software tools sold with Unisys ES7000 servers to provide platform management capabilities.
4. Unisys ES 7000: large-scale Unisys enterprise server system that supports up to 32 processors running the Windows operating system and other operating systems.
5. Script: A set of instructions that automate the operation of an application or utility.
6. Threshold Violations: conditions in which a monitored metric on a system exceeds a predefined level. For instance, if the threshold level for the CPU utilization metric has been set at 90%, values of that metric above 90% would be threshold violations.
7. Predictive Monitoring: monitoring of system metrics for conditions that indicate a potential future problem rather than a current failure. For example, a decreasing trend in the amount of available disk space indicates that the system may become unusable in the future if the trend continues.
8. GUI (Graphical User Interface): system interface that uses pictures, graphs, or other displays in addition to text to convey information to the user.
9. Unisys HealthEvents COM Object: A COM object that supports methods and properties describing a single health violation. A COM object is defined as a component written to the COM standard that provides interfaces which can be invoked by applications; see "COM Object". Glossary Item #40.
10. Health Issues: problems or potential problems with the operation or availability of the system.
11. Health Events: Health issues detected by the Unisys HealthMonitor service. See "Health Issues". Glossary Item #10.
12. Health Violations: see "Health Events". Glossary Item #11.
13. Non-Predictive Alerts: alerts that pertain to an actual current problem rather than a predicted future problem. For example, an alert indicating a decreasing trend in the available disk space predicts a possible future problem; an alert that indicates that there is no disk space left is a non-predictive alert because the problem has actually occurred.
14. Windows .NET Environment: processing environment maintained by the Windows .NET operating system of Microsoft Corp.
15. XML: extensible Markup Language that allows for Web automation and data interchange across multiple platforms and applications.
16. XML Statements: statements written in the XML language.
17. Scriptable Interface: a set of methods and properties on a CON object that are exposed for access from scripting languages.
18. Health (of a complex multiprocessor system): Involves the usability and availability of the system.
19. Knowledge Scripts: The NetIQ name for scripts executed by their AppManager product. See "Server Director Scripts". Glossary Item #2.
20. Health Monitoring (multiprocessor system): Monitoring of system metrics to determine the usability and availability of the system.
21. Canned XML: predefined set of statements written in XML. These statements cannot be altered by the user.
22. HealthEvents COM Object: see "Unisys HealthEvents COM Object". Glossary Item #9.
23. Health Events Object: see "Unisys HealthEvents COM Object". Glossary Item #9.
24. Server Director Tree View: user interface display for the Server Director or AppManager product.
25. Local System: system where a program has been started, in particular a system where the HealthMonitor service and the HealthEvents dll are installed and running.
26. Monitoring Policies: conditions describing metrics for system health. For example, a monitoring policy for CPU utilization might say that: the system is healthy as long as CPU usage is 90% or less.
27. .dll file: dynamic link library file, one of a collection of small programs, any of which can be called when needed by a larger program that is running in the computer.
28. .NET: Windows .NET operating system.
29. COM-capable Scripting or Programming Language: any programming language that understands the COM (Component Object Model) standard.
30. NetIQ AppManager: product of NetIQ Corporation that provides system monitoring and problem reporting using a suite of scripts.
31. Scriptable Data Collection: a collection of data items that is accessible via scripting.
32. HealthEvents dll: dynamic link library file containing the methods and properties supported by the HealthEvents and PredictiveEvents COM objects.
33. PredictiveEvents: A COM object that supports methods and properties describing a single predictive health violation.
34. HealthEvents dll file: see "HealthEvents dll". Glossary Item #332.
35. Policy Check Process: processing thread whose purpose is to determine the current valid set of monitoring policies for this system. This thread is started by the main processing thread of the HealthMonitor service.
36. Provider X: a particular source of health monitoring data. Examples of "providers" are the Windows eventlogs and Windows performance counters.
37. Policy Y: a particular health monitoring policy. Examples of such policies are monitoring that CPU utilization is below 90%, or that a given disk drive has at least 10% available space.
38. Server Sentinel Environment: Set of proprietary software processes that are installed and run on Unisys ES7000 servers.
39. Component Object Model (COM) Standard: Microsoft Architecture for Component interoperability that is not dependent on any particular programming language, is available on multiple platforms, and is extensible. See the white paper at http://msdn.microsoft.com/library/default.asp?url=/library/en-us/dn-comg/html/msdn_comppr.asp for a technical overview.

40. COM Object: A component written to the COM standard that provides interfaces which can be invoked by applications.
41. Long Term Trend: A collection of data points that trend in the same direction (increasing or decreasing) over time.
42. Current Data Point: Value of a monitored system health indicator at this moment in time. For example, for the memory leak, this would be the latest value of the Process/Private Bytes/_Total system counter in megabytes.
43. Saved Trend Data: Collection of data points saved in a file over time; these data points can be analyzed to determine if they constitute a trend.
44. Predictive Data: Monitored system health indicator that can be used to predict a potential future problem, for example the amount of available disk space remaining.
45. PredictiveEvents Collection: A collection of PredictiveEvents objects.
46. Local Object: An instance of a CON object created by a client program in its local programming environment.
47. Global HealthEvents: The system-wide collection of HealthEvents objects maintained by the HealthMonitor service. Client programs obtain a local copy of this global collection for use in their programming environment. There is also a global PredictiveEvents collection.
48. HealthEvents Object: See "Unisys HealthEvents COM Object". Glossary Item #9.
49. Unisys-Supplied Policy File: A file of predefined XML statements describing health monitoring policies that is included with the HealthMonitor service. See "Canned XML". Glossary Item #21.
50. Thread: A sequence of instructions from a single Windows application that execute independently of the parent process; in this case, the HealthMonitor service spawns off separate threads to monitor for policy and provider changes independently of the main processing flow in the HealthMonitor service.
51. Trend (positive and negative): a statistically detectable increase or decrease in the value of a monitored system health counter over time.
52. "Common Sense" Check: validation of a statistical trend against the relationship between the first and last data points used by the trend algorithm. For example, to validate a positive or upward trend, the value of the first data point should be below the value of the last data point. The "common sense" value is designated as "C".
53. Data Spikes: anomalous data points caused by temporary increases or decreases in the value of a monitored system health counter.
54. Upward Trend: a statistically detectable increase in the value of a monitored system health counter over time.
55. Downward Trend: a statistically detectable decrease in the value of a monitored system health counter over time.
56. "Trend" Counter: a system health performance counter whose values can be tracked to detect long-term increases or decreases in the availability of a system resource. Examples are counters for processor, disk, and memory usage.
57. Tolerance Value: the highest or lowest value a system health performance counter can reach without violating the policy that monitors that counter.
58. Lower Bound Tolerance: the lowest value a system health performance counter can reach without violating the policy that monitors that counter.
59. Upper Bound Tolerance: the highest value a system health performance counter can reach without violating the policy that monitors that counter.
60. Unisys-Provided. Policy File: A file of predefined XML statements describing health monitoring policies that is included with the HealthMonitor service.
61. Trend Analysis Health Policy: an algorithm that looks for a trend in the values from a particular system health performance counter. Examples are policies that look for trends in CPU utilization or available disk space.
62. Trend Type: whether the trend being sought in the data is for increasing data values (an upward or positive trend) or for decreasing data values (a downward or negative trend).
63. Allowable Upper Bound: the highest value a system health performance counter can reach without violating the policy that monitors that counter. See "Upper Bound Tolerance". Glossary Item #59.
64. Allowable Lower Bound: the lowest value a system health performance counter can reach without violating the policy that monitors that counter. See "Lower Bound Tolerance". Glossary Item #58.
65. Saved Policy: a set of predefined XML statements describing a single health monitoring policy included with the HealthMonitor service. See "Unisys-Provided Policy File". Glossary Item #60.
66. Trend Counter Limit (TCL): a predefined value indicating the number of sample sets that must agree on a trend direction before the trend policy is considered violated. For examples of a trend policy, see "Trend Analysis Health Policy", Item # 61 of Glossary.
67. Data Points: the individual system health counter data values that are monitored for a particular trend policy.
68. Sample Set: a collection of a predetermined number of data points.
69. "Not A Trend" Counter: an integer indicating the number of sample sets whose data points do not reflect a trend in a particular direction.
70. DeltaD: the size of the decrease in values in a sample set indicating a downward trend; this is the average difference between the values of the sample set multiplied by the number of data points in the set minus one multiplied by the first value in the set.
71. DeltaI: the size of the increase in values in a sample set indicating an upward trend; this is the average difference between the values of the sample set multiplied by the number of data points in the set minus one multiplied by the first value in the set.
72. Saved Increase Values: the collection of DeltaI values that have not been cancelled out by subsequent decreases in the monitored value.
73. Saved Decrease Values: the collection of DeltaD values that have not been cancelled out by subsequent increases in the monitored value.
74. Decrement Counter: reduce the value stored in an integer counter by subtracting 1 from it.
75. SI: the sum of all values contained in the DeltaI collection.
76. SD: the sum of all values contained in the DeltaD collection.

77. D: the number of saved increase values that must be removed from the collection of saved increase values to balance a decrease in the value of the monitored system health counter; or, the number of saved decrease values that must be removed from the collection of saved decrease values to balance an increase in the value of the monitored system health counter.
78. Sample Set: A sample set is a collection of a predetermined number of data points for a particular health policy. The number of points in a sample set is part of the policy definition. For example, for the policy that looks for memory leaks, the number of data points in a sample set is 50. The memory leak policy monitors the system counter indicating the number of megabytes of private memory currently allocated, so the 50 data points in the sample set for that policy would be the value of that memory counter at 50 consecutive points in time (how often we collect samples is also specified by the policy, in this case it's every 900 seconds).
79. Windows Event Log: File used by the Windows operating system to record events on the system.
80. APP Manager Product: see "NetIQ AppManager", Glossary Item # 30.
81. Provider: a particular source of health monitoring data. Examples of "providers" are the Windows event-logs and Windows performance counters.
82. Events (Predictive): alerts that pertain to a predicted future problem; for example, an alert indicating a decreasing trend in the amount of disk space available on the system.
83. Events (Violation): alerts that pertain to an actual system problem; for example, an alert indicating that there is no disk space left on the system.
84. Health Events Collection: A collection of HealthEvents objects.
85. Global Health Events: see "Global HealthEvents", Glossary Item # 47.
86. Data points: see Glossary Item #67, "Data Points", and Glossary Item #42, "Current Data Point".
87. Counter, Health Counter: system performance data exposed through various Windows operating system interfaces, such as Performance Manager or Windows Management Instrumentation (WMI).
88. Memory Leak: The failure of a program to release its unused memory upon completion, causing that memory to be unavailable for use by other programs.
89. TCL: see "Trend Counter Limit (TCL)", Glossary Item #66.
90. Saved Policy: same as Glossary Item #65.

GENERAL OVERVIEW

The Unisys HealthMonitor service automates management of system health monitoring, prediction, and notification, and provides the ability to correct system health issues in the Server Sentinel environment.

The exemplary Windows .NET service portion of the solution involved herein does the following: (Item "d" below is the focus of the present disclosure)

(a) executes the health monitoring policy for the system, which is expressed in the form of an inbuilt sequence of XML statements describing conditions to monitor for and responses to take when those conditions are encountered. The flexibility of XML allows complex monitoring conditions to be expressed.
(b) runs automatically at system startup; no configuration or other user intervention is required.
(c) monitors only the subset of conditions described in the canned XML that is applicable to the current system configuration; conditions involving items of hardware or software not present on the system are not activated unless/until those items become present, and items that are removed after the service commences will cease to be monitored when the service notices their absence.
(d) includes a trend analysis module that uses the data from several of the monitored metrics to calculate the length of time to a potential future failure; these long-term trend warnings and other warnings based on shorter-term data provide a degree of "predictive" warning of potential problems that was previously absent.
(e) collects information about the normal state of the system as reported by several metrics; this information can be used by a future release of the service to improve the monitoring policy on the fly.

The monitoring service uses a set of interfaces implemented in the Unisys HealthEvents COM object to capture information about health violations and predicted violations on the system. The HealthEvents object maintains the collection of violation events and exports a scriptable interface that can be used to retrieve one or more of the events for display or further processing by some other application running on the system. In this particular implementation, the Server Director retrieves and processes the saved events.

Figure 8:
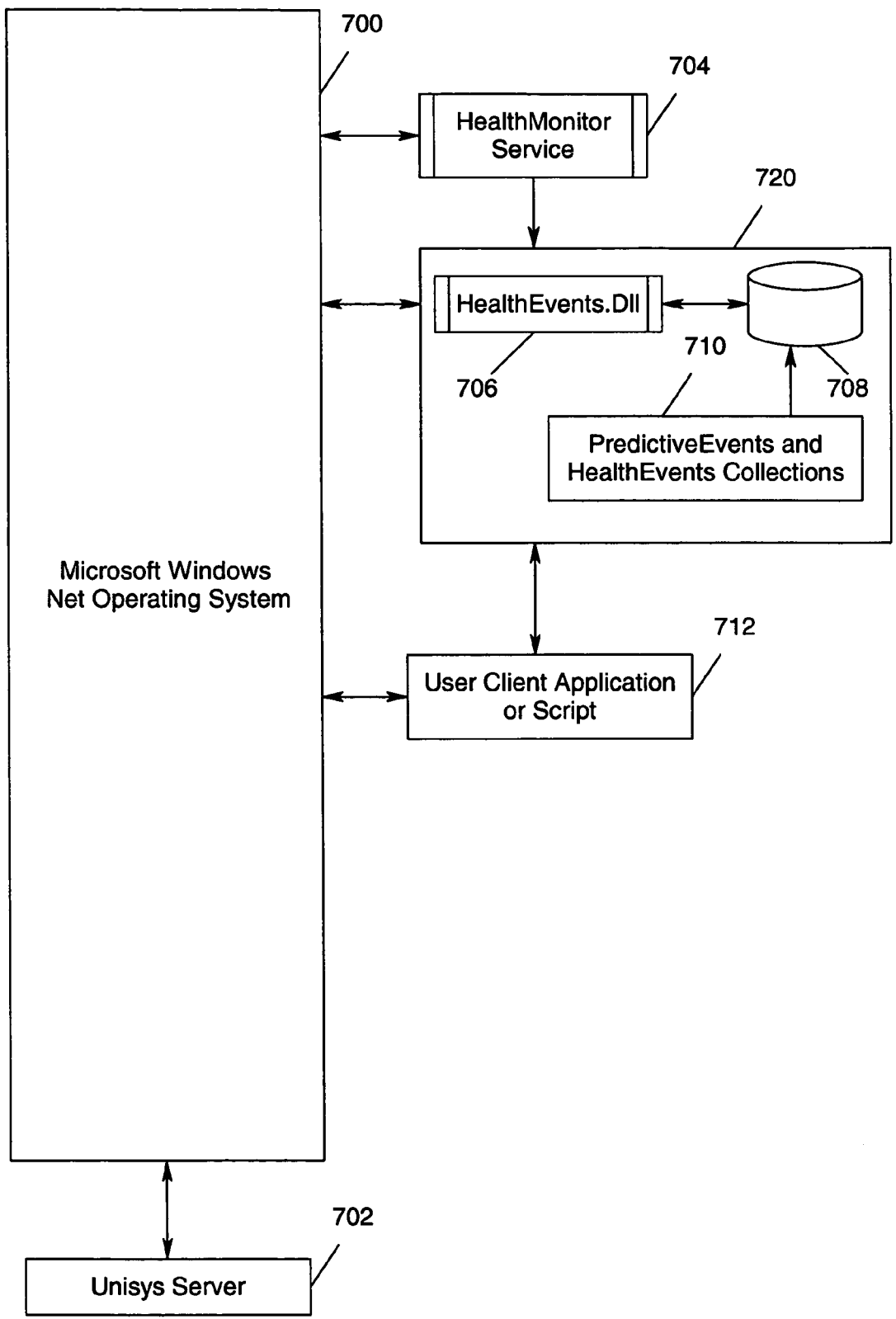
FIG. 8 shows an overall system block diagram in which the method of the present invention is utilized.

The final piece of the solution involves two new knowledge scripts (712) (FIG. 8) that run in the Server Director (an application in the Unisys Server 702) (FIG. 8). The scripts provide notification of health events as they are detected in an environment and a form that is already familiar to existing Server Sentinel customers. These scripts retrieve the server (non-predictive) alerts and predictive alerts from the event collections maintained by the HealthEvents object and flash the associated icon in the Server Director tree view to direct the end user to the site of the problem. (Predictive alerts will flash both the icon for the affected system component and the "Predictive Alerts" icon; server alerts will flash on the icon of the affected component; see FIG. 8.) Server Director also provides a rich set of additional corrective and notification actions that can be associated with either or both scripts, as the user desires.

DETAILED DESCRIPTION

The general purpose of the software methodology described herein is to monitor the health of multi-processor systems, and appropriately respond to a current or potential system health problem, thereby putting a package of data describing the event into a scriptable data collection that is accessed by a script running in a separate process of the system, called Server Director. This Server Director monitors multiple systems using a script-driven approach and has a GUI (Graphical User Interface) that displays information about the systems it monitors.

The purpose of the HealthMonitor Trend Analysis Module is to detect positive or negative trends in system health data. At the core of this module is an algorithm that analyzes a series of data points that have been collected into sample sets over time. The algorithm will analyze several sample sets to determine whether or not there is a trend. This algorithm is applied individually to several different system health counters.

When a complete sample set is collected, the algorithm calculates the average percent difference between each data point. The result is taken and multiplied by the size of the sample set to calculate the total percentage difference across the set. Because individual data values may be erratic, the total result for the set is compared against a lower and upper bound percent tolerance value. The algorithm also includes a flag that controls whether the code is looking for positive (increasing over time) trends or negative (decreasing over time) trends. For each sample set, the algorithm has three possible outcomes. The following scenario groups describes those outcomes when searching for an upward trend:

1. If the total percent difference falls between the upper and lower bound tolerance values, this sample set indicates that system health is at a steady state, and a counter that tracks sample sets with no notable upward or downward trend is incremented. This aids in reducing false readings caused by data spikes. If incrementing the "not a trend" counter causes it to exceed an established threshold, all trend indicator counters are reset to zero and the algorithm is completely reset. Crossing this threshold indicates that a new steady state for this particular monitored counter has been reached and that the trend detection process for that counter should restart.

2. In the event that the total percent difference exceeds the upper bound tolerance value, the total percent difference is multiplied by the first value in the sample set to estimate the size of the increase. This value is recorded for later use. A counter that tracks sample sets representing a notable trend in the desired direction (upward in this case) is incremented, and the counter that tracks steady state sample sets is reset to zero. If incrementing the "trend" counter causes it to exceed an established threshold, the algorithm indicates that a trend has been detected; at this point, the user is alerted to the trend, all trend indicator counters are reset and all recorded data is cleared in order to reset the algorithm.

3. If the total percent difference is below the lower bound tolerance value, then the total percent difference is multiplied by the first value of the sample set to estimate the size of the decrease. This new value is then compared against any increasing difference values that were recorded in scenario 2, and the "trend" counter is decremented in proportion to the difference between the estimated value of the decrease and the saved increase value. If there are no previously recorded increase values, then the "trends counter is simply decremented by 1. (The "trend" counter will never be decremented below 0).

If the algorithm has been configured to look for negative trends, the process is the same but the logic is reversed. Scenario 2 is executed if the total percent difference falls below the lower bound tolerance, and saves values indicating the size of each decrease; scenario 3 occurs if the result is greater than the upper bound tolerance, and cancels out previously saved decreases according to the size of the current increase.

FIG. 8 illustrates a generalized block diagram in which the method of the present invention could be used. A Microsoft Windows .NET operating system exists (700), which communicates data to and from a Unisys server 702. A series of processes are included in module 720, which include a HealthEvents.dll file (706), which communicates with a data store 708. The data store 708 contains the PredictiveEvents and HealthEvents collections 710. The data in these collections is accessed through the HealthEvents.dll (706) hosted by the Microsoft Windows .NET operating system 700. This series of process and data in module 720 receive their input from the HealthMonitor service 704.

A user client application or script 712, also hosted by the Microsoft Windows .NET operating system 700, maintains communication with the set of processes in module 720 as well.

FIG. 1 is a flowchart that illustrates the process flow of the trend analysis health policy. For each trend analysis health policy in Unisys-provided policy file (Block A1), a process to get allowable upper boundary U from a specifically saved policy (Block A2) is executed. Next, a process to get allowable lower boundary L from saved policy (A3) is executed, and is followed by a process to get trend type (upward or downward) from the saved policy (Block A4). A number of data points N from saved policy is received (Block A5), and the trend counter limit TCL is set to a value specified in policy (Block A6).

Figure 2:
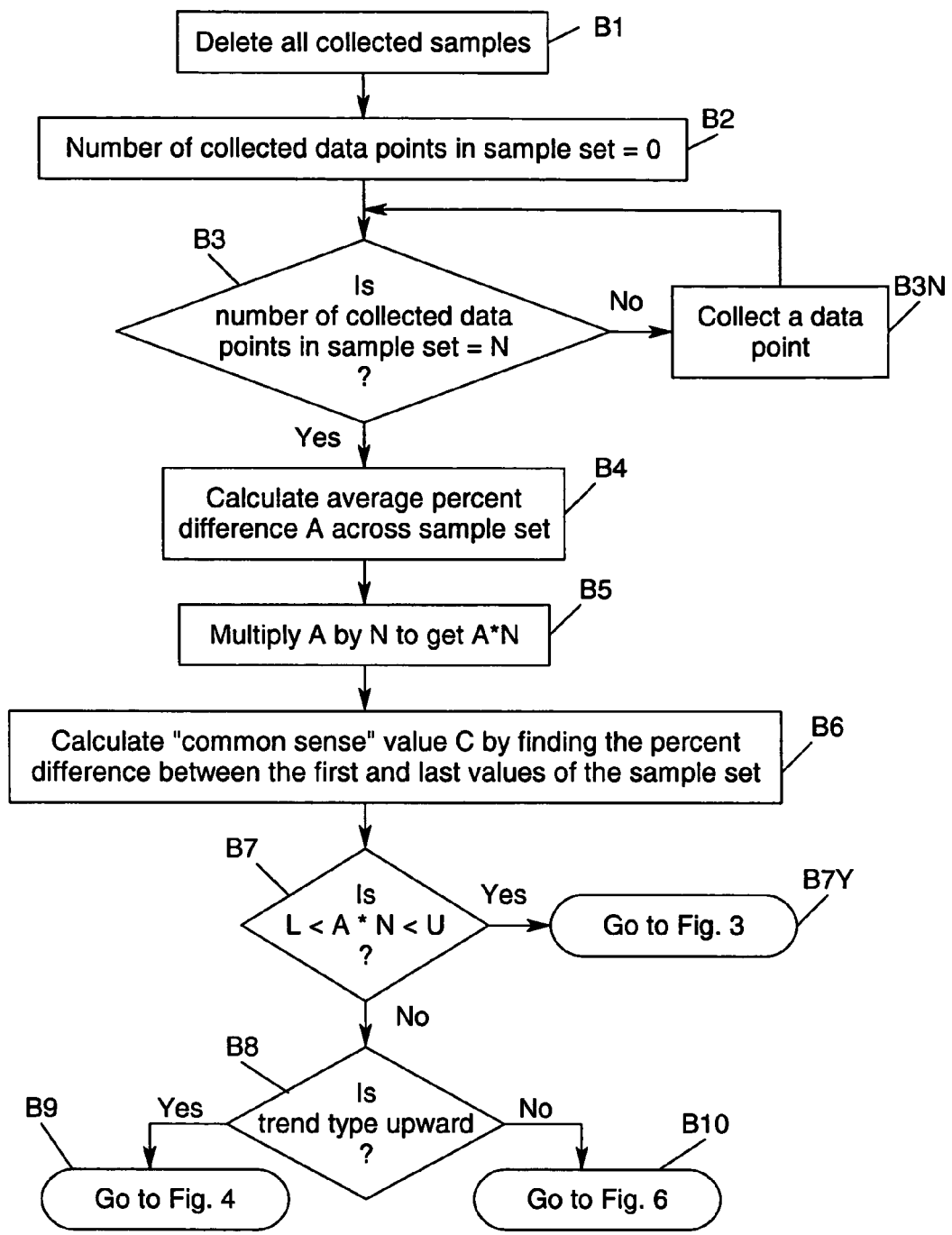
FIG. 2 is a flowchart which illustrates the collection of a sample set for selected policy and calculations and determination of trend type.

FIG. 2 is a flowchart that illustrates the calculations and determination of trend type. The process begins by deleting all collected samples (Block B1), and by executing a process to set the number of collected data points in the sample set to zero (Block B2). An inquiry is made at step B3 to check if the number of collected data points in sample set N is equal to N. If the number of collected data points in the sample set are not equal to N (No to inquiry B3), a data point is collected at step B3N, and the process returns to check the remaining number of collected data points in the sample set at step B3. If the answer to inquiry B3 is YES, and the number of data points is equal to N, the average percent difference A is calculated across the sample set (Block B4), and A is multiplied by N to get A*N (Block B5). Next, the common sense" value C is calculated by finding the percent difference between the first and last values of the sample set (Block B6). An inquiry is then made at step B7 to check if L is less than A*N, and A*N is less than U. If L<A*N<U is true (yes to inquiry B7), the process continues to FIG. 3 (Bubble B7Y). If L<A*N<U is not true (No to inquiry B7), another inquiry is made at step B8 to check if the trend type is upward. If the trend type is upward (Yes to inquiry B9), the process continues at FIG. 4, via bubble B9. If the trend type is not upward (No to inquiry B8), the process continues at FIG. 6 via bubble B10.

Each data point is an individual sample of the monitored system counter at an instant in time. Which counter is being sampled varies across the different health monitoring policies. For the memory leak policy (as indicated later in FIG. 2) we've used as an example, the sample will be the value of the Process/Private Bytes/_Total system counter, which tracks the amount of memory being used by all programs running on the system. A memory leak occurs when a software program does not clean up its unused memory properly. As a result, system memory is left allocated when it should have been freed up for use by other software. When computer systems run for years without interruption, the continual allocation of just a few words of memory will eventually exhaust the memory pool. As a result, the computer will "freeze up". This happens often on home PCs. The solution is to just restart the systems. This solution is not an option when you are running mission critical applications, serving thousands of users a second. The memory leak policy of the HealthMonitor service monitors the amount of memory in use on the system for an upward trend indicating that memory allocation is continuing to grow. If such a trend is detected, it will bring this trend to the administrator's attention. Other policies sample the percentage of each processor being used, the number of errors reported by each disk, and so forth. These data points are collected using function calls built into the Microsoft Windows operating system; the calls are made by the HealthMonitor service as detailed in the previous patent application (U.S. Ser. No. 10/731,045). Some of the monitoring policies enforced by the HealthMonitor service are simple "threshold" policies, where a single data point that exceeds the threshold value causes an alert to be raised. In contrast, the current embodiment pertains to the method used by other monitoring policies to look for long-term trends across multiple data points, which is why it discusses grouping multiple individual data points into "sample sets" and then analyzing those sets rather than the individual data points themselves.

The sample set is initialized by deleting any data points previously collected and setting the count of data points in the collection to 0. Then, data points are collected at the sampling interval specified in the health policy until the desired number of data points (50 in this case) have been collected. The average percent difference of those 50 values is then calculated; that is, the difference between each data point and the one before it in the set is calculated and then multiplied by 49 (50−1, the number of differences between values in the sample set) to get a value representing the general increase or decrease in the allocation of the monitored resource (private memory, in the case of the memory leak policy) across the sampling period.

Consider an example with a sample size of 5 rather than 50, and sample set values of {1000, 1000, 2000, 2000, and 1000}. The percent differences between those values would be 0% (from 1000 to 1000), 100% (from 1000 to 2000), 0% (from 2000 to 2000) and −50% (from 2000 to 1000), leading to an average percent difference of 12.5% ((0+100+0−50)/4), or 0.125. This value is referred to in FIG. 2 as A. A is multiplied by N (the number of data points in the sample set, which is 5 in this case) to get A*N, which is 0.625. The next step is the "common sense" comparison of the first and last values in the sample set; this comparison shows no difference, as both values are 1000, so C (the "common sense" value) is 0. Finally, the average percent difference calculated here (A*N) is compared to the upper and lower bounds specified by the policy. For the memory leak policy, the lower boundary L is −0.1 and the upper boundary U is 0.1; that is, the policy is looking for more than a 10% deviation from the norm one way or the other. The value of A*N in this example is 0.625, which does not fall between −0.1 and 0.1, so where we go next is determined by the type of trend for which this policy monitors. In the case of the memory leak policy we are looking for an upward trend, so in this example we would proceed to FIG. 4 at this point. If A*N fell between −0.1 and 0.1 we would go to FIG. 3, and if A*N did not fall between the policy limits but the policy was monitoring for a downward trend, we would continue at FIG. 6.

Figure 3:
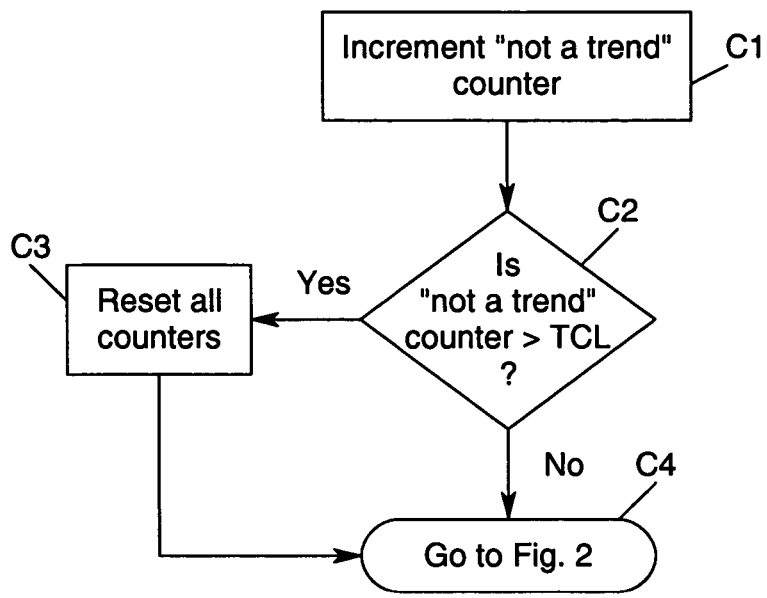
FIG. 3 is a flowchart illustrating factors which indicate the "not a trend" state.

FIG. 3 is a flowchart which illustrates the "not a trend" diagram. The process begins by incrementing the "not a trend" counter at step C1. An inquiry is then made at step C2 to check if the "not a trend" counter is greater than TCL. If the "not a trend" counter is not greater than TCL (No to inquiry C2), the process continues at FIG. 2 via bubble C4. If the "not a trend" counter is greater than TCL (Yes to inquiry C2), all counters are reset (Block C3), and the process continues at FIG. 2 via bubble C4.

It should be noted that FIG. 3 is the "not a trend" diagram. Control passes here when the average percent difference of the values in the current sample set is between the lower bound and the upper bound for the policy. If the number of collected sample sets that fall into this category exceeds the "trend counter limit" (currently 10 for all HealthMonitor trending policies), then the algorithm concludes that the value of the monitored health index has reached a steady state and no trend exists. In this case, the collected data is discarded and the collection of new sample sets recommences back at FIG. 2. Our hypothetical sample set of five values above would not fall into this category because the average percent difference across the five values was 0.625, above the upper limit of 0.1. If instead that value was between −10% and 10% (−0.1 and 0.1), control would pass here. If that was the tenth such sample set we had encountered recently, it would cause the data collection portion of the algorithm to reset.

Figure 4:
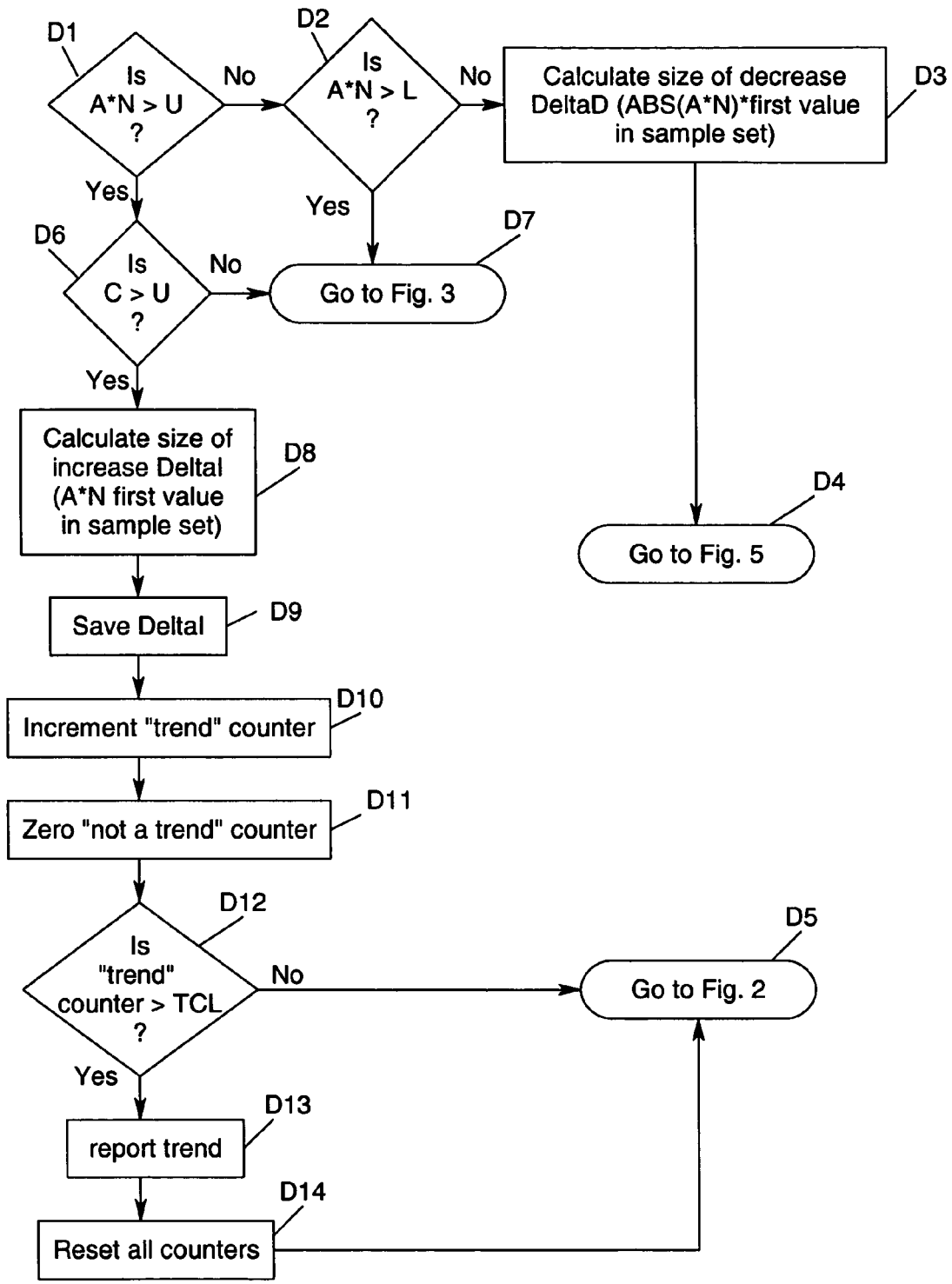
FIG. 4 illustrates a process that analyzes sample sets for the "upward trend" direction.

FIG. 4 is a flowchart that illustrates the "upward trend" diagram. First, an inquiry is made to check if A*N>U (Diamond D1). If A*N>U is false (No to inquiry D2), another inquiry is made at step D2 to check if A*N>L. If A*N>L is true (Yes to inquiry D2), the process continues at FIG. 3 via bubble D7. If A*N>L is not true (No to inquiry D2), the size of decrease DeltaD (A*N first value in sample set) is calculated at step D3, and continues to FIG. 5 via bubble D4.

If A*N>U is true (Yes to inquiry D1), another inquiry is made at step D6 to check if C>U. C is the "common sense" value of glossary item #52. If C>U is false (No to inquiry D6), the process continues at FIG. 3 via bubble D7. If C>U is true (Yes to inquiry D6), the size of increase DeltaI (A*N first value in sample set) is calculated at step D8. Next, a process is executed to save DeltaI (Block D9), the "trend" counter is incremented (Block D10), and a process to zero the "not a trend" counter is initiated at step D11. An inquiry is then made at step D12 to check if the "trend" counter is greater than TCL. If the "trend" counter is not greater than TCL (No to inquiry D12), the process continues at FIG. 2 via bubble D5. If the "trend" counter is greater than TCL (Yes to inquiry D12), the trend is reported (Block D13), and all the counters are reset (Block D14), and the process continues at step D5 to go to FIG. 2.

It should be noted that control passes here when the average percent difference of the values in the current sample set are outside the upper and lower bounds for the policy and the policy is monitoring for an upward trend. There are several possibilities here, depending on the data.

1. If the average percent difference is above the upper bound for the policy and the "common sense" value is also above that limit, then the data points seem to represent a genuine upward trend. Our hypothetical sample set yielded a value of 0.625, which is indeed above the upper bound for the policy (0.1), but the "common sense" value was 0, indicating that this sample set probably does not represent a trend; in this case control would pass to FIG. 3. If instead, the "common sense" value C exceeded 0.1, the size of the upward movement would then be calculated by multiplying the average percent difference by the first value in the sample set to get an estimated data point; for instance, in our hypothetical sample set this would be 0.625*1000, or 625. This value, called DeltaI, is saved in a set of "saved increase values". The counter that indicates the number of times the data has indicated a trend recently is incremented by one, and the counter indicating the number of times the data has indicated the absence of a trend recently is zeroed. If the trend counter exceeds the "trend counter limit" of 10, then the HealthMonitor service raises an alert to report the trend to the user and resets all counters and data collections. Monitoring then resumes at FIG. 2.

2. If the average percent difference is less than or equal to both the upper and the lower bounds for the policy, the size of the downward movement (called DeltaD) is calculated by multiplying the average percent difference by the first value in the sample set to get an estimated data point. If our hypothetical sample set had yielded a value of −0.625, control would come here. The estimated size of the decrease in this case would be −0.625*1000, or −625. Control would then pass to FIG. 5, which describes how the algorithm balances downward data values with previously-saved upward values when looking for an overall upward trend.

3. If the average percent difference is less than or equal to the upper bound for the policy (0.1) but is above the lower bound (−0.1), then the data points seem to indicate that there is no trend. Control passes to FIG. 3, the "not a trend" diagram. A sample set like {1000, 1000, 1000, 1000, and 1000} would yield an average percent difference of 0, which would fall into this category.

Figure 5:
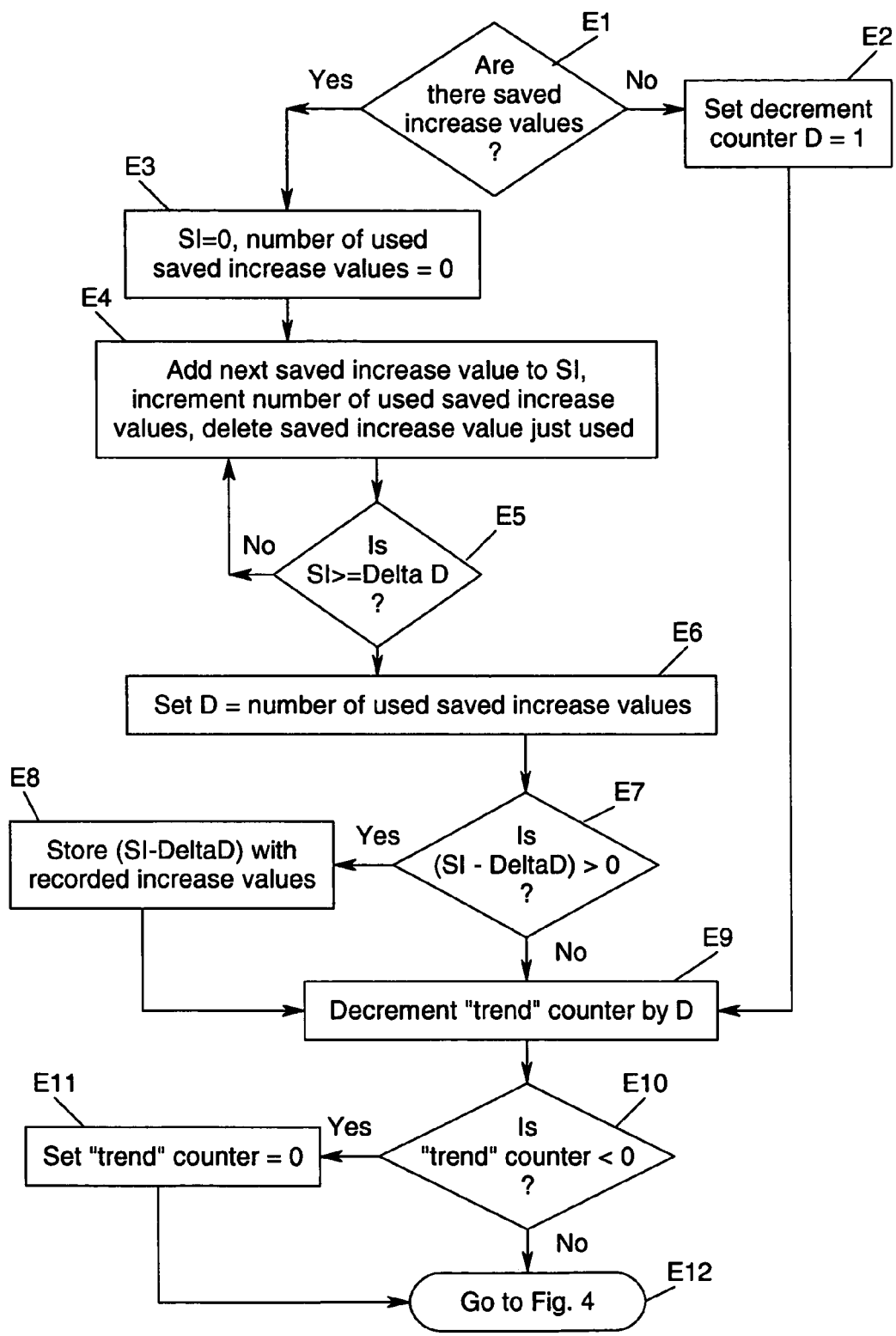
FIG. 5 illustrates an algorithm that accounts for an apparent downward data trend for a health policy that requires an upward trend

FIG. 5 illustrates how the algorithm accounts for an apparent downward data trend for a health policy that is looking for an upward trend. First, an inquiry is made at step E1 to check if there are any saved increase values. If there are no values saved (No to inquiry E1), the decrement counter D is set to 1 (Block E2), and the process continues forward to step E9 to decrement the "trend" counter by counter D. If there are saved increase values (Yes to inquiry E1), SI is set to 0 and the number of used saved increase values is also set equal to zero (Block E3). The next saved increase value to SI is added, the number of used saved increase values is incremented, and the saved increase value just used is deleted (Block E4). An inquiry is then made at step E5 to check if SI>=DeltaD. If SI>=DeltaD is not true (No to inquiry E5), the process returns to step E4 to add the next saved increase value to SI, increment the number of used saved increase values, and delete the saved increase value just used. If SI>=DeltaD is true (Yes to inquiry E5), D is set equal to the number of used saved increase values (Block E6).

Another inquiry is then made at step E7 to check if (SI−DeltaD)>0. If inquiry E7 is true (Yes to inquiry E7), (SI−DeltaD) is stored with other previously-recorded increase values (Block E8), and continues at step E9 to decrement the "trend" counter by D. If (SI−DeltaD)>0 is false (No to inquiry E7), the "trend" counter is decremented by D (Block E9). Another inquiry is made at step E10 to check if the "trend" counter is less than zero (Diamond E10). If the "trend" counter is less than zero (Yes to inquiry E10), the "trend" counter is set equal to zero at step E11, and then proceeds to FIG. 4 via bubble E12. If the "trend" counter is not less than zero (No to inquiry E10), the process continues to FIG. 4 via bubble E12.

Any recent sample sets indicating an apparent upward trend would have yielded an estimated data point calculated from the average percent difference across the sample set and the first value in the sample set. This value encapsulates the size of the increase represented by that sample set, which is saved off in a set of "saved increase values". Our hypothetical sample set of five values yielded a saved value of 625. Assume that the next sample set indicated a decrease in the monitored data and that the size of the decrease (DeltaD) for that sample set was 500. The algorithm expressed in FIG. 5 would note the previously saved increase value of 625 and would use it to offset the new decrease. The most recent saved increase value (625) is referred to here as SI, and the number of saved values needed to offset the decrease is as follows:

1. The value 625 is removed from the set of saved increase values. Since SI (625) is greater than or equal to DeltaD (500), only one saved increase value is needed to offset the decrease, so D (the number of used saved increase values) is set to 1. Since SI−DeltaD (625−500) is greater than 0, the unused increase of 125 remains available to offset future decreases, so that value is added to the list of saved increase values. The "trend" counter is then decremented by the number of used increase values (1 in this case). The "trend" counter cannot be a negative number, so if this decrement causes it to fall below 0 it is simply set to 0 instead. Collection of additional sample sets then resumes at FIG. 2.

Figure 6:
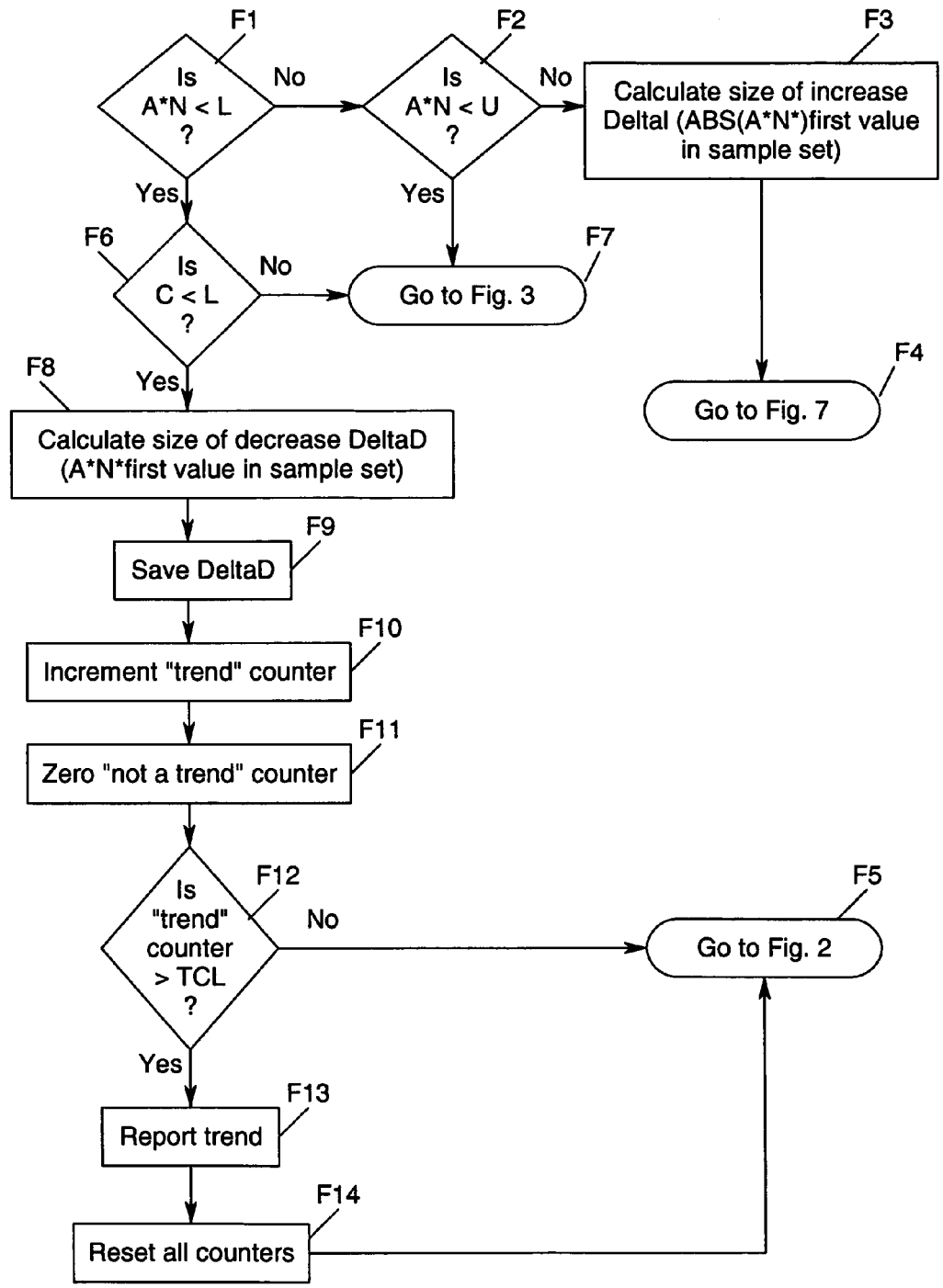
FIG. 6 is a flowchart that analyzes sample sets for the "downward trend" indication.

FIG. 6 is a flowchart that illustrates the "downward trend" diagram. First, an inquiry is made to check if A*N<L (Diamond F1). If A*N<L is false (No to inquiry F1), another inquiry is made at step F2 to check if A*N<U. If A*N<U is true (Yes to inquiry F2), the process continues at FIG. 3 via bubble F7. If A*N<U is not true (No to inquiry F2), the size of increase DeltaI (A*N*first value in sample set) is calculated at step F3, and continues to FIG. 7 via bubble F4.

If A*N<L is true (Yes to inquiry F1), another inquiry is made at step F6 to check if C<L. If C<L is false (No to inquiry F6), the process continues at FIG. 3 via bubble F7. If C<L is true (Yes to inquiry F6), the size of decrease DeltaD (A*N first value in sample set) is calculated at step F8. Next, a process is executed to save DeltaD (Block F9), the "trend" counter is incremented (Block F10), and a process to zero the "not a trend" counter is initiated at step F11. An inquiry is then made at step F12 to check if the "trend" counter is greater than TCL. If the "trend" counter is not greater than TCL (No to inquiry F12), the process continues at FIG. 2 via bubble F5. If the "trend" counter is greater than TCL (Yes to inquiry F12), the trend is reported (Block F13), and all the counters are reset (Block F14), and the process continues at step F5 to go to FIG. 2.

It should be noted that control passes here when the average percent difference of the values in the current sample set are outside the upper and lower bounds for the policy and the policy is monitoring for an downward trend. There are several possibilities here, depending on the data. Consider a sample set with the values of {2000, 2000, 1000, 1000, 500}. The average percent difference for this set would be (0−100+0−50)/4), or −0.375. A*N would be −1.875, and the "common sense" value C would be −0.75 ((500/2000)−1). For the memory leak policy, the lower bound L is −0.1 and the upper bound U is 0.1, which then involves:

1. If the average percent difference is below the lower bound for the policy and the "common sense" value is also below that limit, then the data points seem to represent a genuine downward trend. Our hypothetical sample set yielded a value of −1.875, which is indeed below the lower bound for the policy (−0.1), and the "common sense" value of −0.75 is also below that threshold. The size of the downward movement is then calculated by multiplying the average percent difference by the first value in the sample set to get an estimated data point; in our example this would be −1.875*2000, or −3750. The absolute of this value (3750), called DeltaD, is saved in a set of "saved decrease values". The counter that indicates the number of times the data has indicated a trend recently is incremented by one, and the counter indicating the number of times the data has indicated the absence of a trend recently is zeroed. If the trend counter exceeds the "trend counter limit" of 10, then the HealthMonitor service raises an alert to report the trend to the user and resets all counters and data collections. Monitoring resumes afresh at FIG. 2.

2. If the average percent difference is greater than or equal to both the upper and the lower bounds for the policy, the size of the upward movement (called DeltaI) is calculated by multiplying the average percent difference by the first value in the sample set to get an estimated data point. If our hypothetical sample set had yielded a value of 1.875, control would come here. The estimated size of the increase in this case would be 1.875*2000, or 3750. Control would then pass to FIG. 7, which describes how the algorithm balances upward data values with previously-saved downward values when looking for an overall downward trend.

3. If the average percent difference is greater than or equal to the lower bound for the policy (−0.1) but is less than or equal to the upper bound (0.1), then the data points seem to indicate that there is no trend. Control passes to FIG. 3, the "not a trend" diagram. A sample set like {1000, 1000, 1000, 1000, and 1000} would yield an average percent difference of 0, which would fall into this category.

Figure 7:
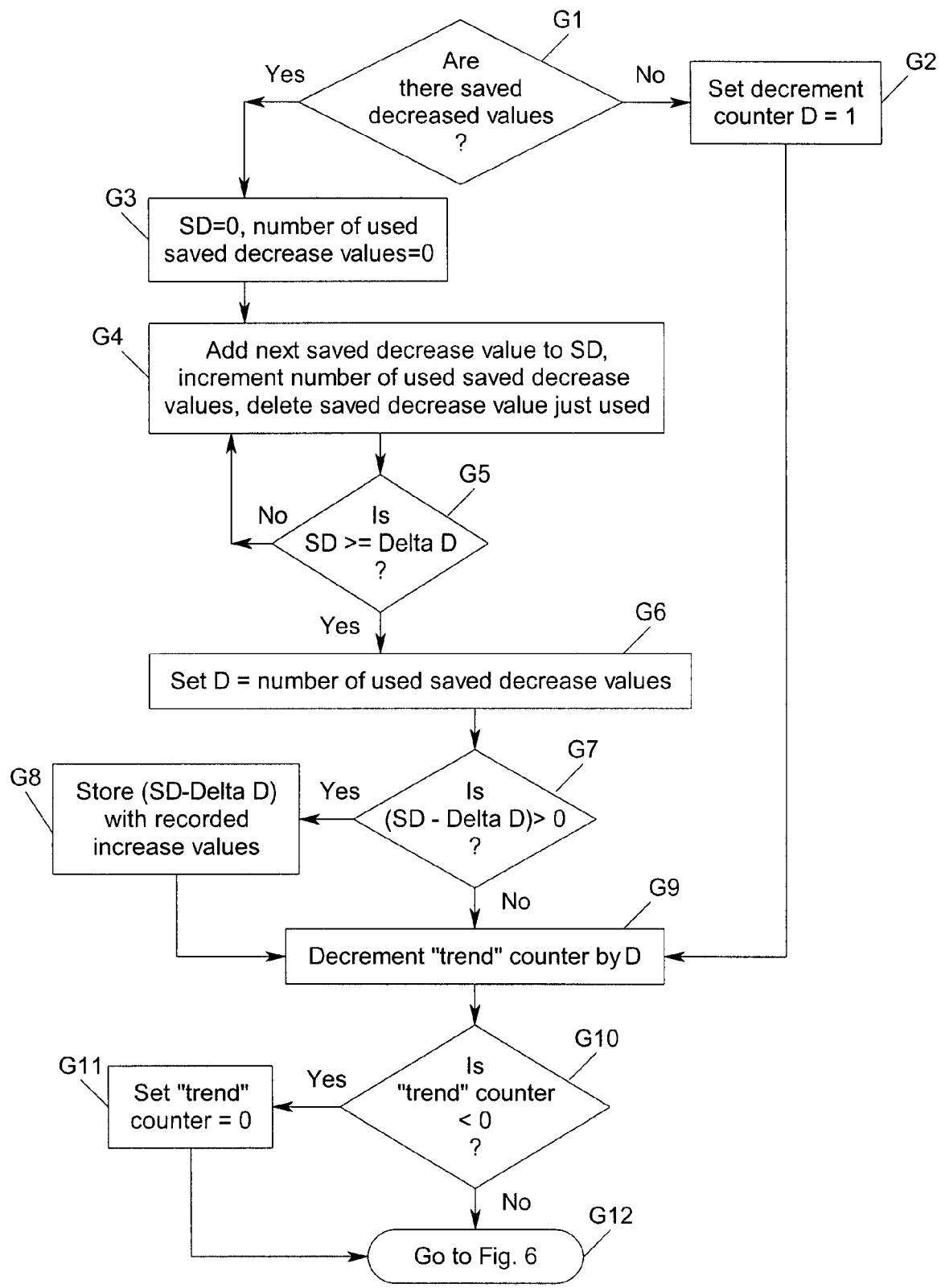
FIG. 7 illustrates an algorithm that accounts for an apparent upward data trend for a health policy that requires a downward trend.

FIG. 7 illustrates how the algorithm accounts for an apparent upward data trend for a health policy that is looking for a downward trend. First, an inquiry is made at step G1 to check if there are any saved decrease values. If there are no values saved (No to inquiry G1), the decrement counter D is set to 1 (Block G2), and the process continues forward to step G9 to decrement the "trend" counter by D. If there are saved decrease values (Yes to inquiry G1), SD is set to 0 and the number of used saved decrease values is also set equal to zero (Block G3). The next saved increase value to SD is added, the number of used saved decrease values is incremented, and the saved decrease value just used is deleted (Block G4). An inquiry is then made at step G5 to check if SD>=DeltaD. If SD>=DeltaD is not true (No to inquiry G5), the process returns to step G4 to add next saved decrease value to SI, increment the number of used saved decrease values, and delete the saved decrease value just used. If SD>=DeltaD is true (Yes to inquiry G5), D is set equal to the number of used saved decrease values (Block G6).

Another inquiry is then made at step G7 to check if (SD−DeltaD)>0. If inquiry G7 is true (Yes to inquiry G7), (SD−DeltaD) is stored with the recorded increase values (Block G8), and continues at step G9 to decrement the "trend" counter by D. If SD−DeltaD>0 is false (No to inquiry G7), the "trend" counter is decremented by D (Block G9). Another inquiry is made at step G10 to check if the "trend" counter is less than zero (Diamond G10). If the "trend" counter is less than zero (Yes to inquiry G10), the "trend" counter is set equal to zero at step G11, and then proceeds to FIG. 6 via bubble G12. If the "trend" counter is not less than zero (No to inquiry G10), the process continues to FIG. 6 via bubble G12.

Any recent sample sets indicating an apparent downward trend would have yielded an estimated data point calculated from the average percent difference across the sample set and the first value in the sample set. This value encapsulates the size of the decrease represented by that sample set, which is saved off in a set of "saved decrease values". Our latest hypothetical sample set yielded a saved decrease value of 3750. Assume that the next sample set indicated an increase in the monitored data and that the size of the increase (DeltaI) for that sample set was 500. The algorithm expressed in FIG. 7 would note the previously saved decrease value of 3750 and would use it to offset the new increase. The most recent saved increase value (3750) is referred to here as SD, and the number of saved values needed to offset the increase is 1. The value 3750 is removed from the set of saved decrease values. Since SD (3750) is greater than or equal to DeltaI (500), only one saved decrease value is needed to offset the increase, so D (the number of used saved decrease values) is set to 1. Since SD−DeltaI (3750−500) is greater than 0, the unused increase of 3250 remains available to offset future increases, so that value is added to the list of saved decrease values. The "trend" counter is then decremented by the number of used decrease values (1 in this case). The "trend" counter cannot be a negative number, so if this decrement causes it to fall below 0 it is simply set to 0 instead. Collection of additional sample sets then resumes at FIG. 2.

Described herein has been a method for tracking the values of system health data over time and determining whether those values represent a trend in an upward or downward direction. The algorithmic steps in the method attempt to avoid false alerts by smoothing the data and offsetting increases against decreases in order to compensate for short-term swings in the monitored data.

Though one embodiment of the invention has been illustrated, other embodiments may be implemented which still utilize the essence of the invention as defined in the attached claims.

What is claimed is:

1. In a network of multi-processors having a series of local systems operated by Client-Users wherein a series of defined operating policies (P) are stored along with acceptable parameter limits for each policy, a method for developing a health trend analysis of future possible problems in network resources comprising the steps of:
   (a) accessing a health counter value for the allowable upper boundary "U" for a selected operating policy (P);
   (b) accessing a health counter value for the allowable lower boundary "L" for said selected operating policy (P);
   (c) establishing, via a trend counter, a trend of upward or downward increases or decreases in the availability of system resources which includes the steps of:
      (c1) collecting data points, in a sample set "N" where "N" is the number of collected data points;
      (c2) verifying that the number of collected data points is="N",
      (c3) calculating the average percent difference "A" which represents the cumulative difference between each data point and the one just before it for all points in the set;
      (c4) multiplying the average difference "A" by the number "N" of data points to get a result A*N;
      (c5) calculating a common sense value "C" by finding the percent difference between the first value and the last value of the sample set;
      (c6) establishing whether the product A*N is greater than said lower boundary "L" and less than said upper boundary "U";
      (c7) preparing a summary of step (c6);
   (d) acquiring a series of data points associated with said selected policy (P);
   (e) setting a counter limit "TCL" (Trend Counter Limit) to a value specified for the selected policy (P).

2. The method of claim 1 wherein step (c7) includes the steps of:
   (8c7a) determining that the value of A*N falls between "L" and "U" (YES);

(8c7b) incrementing a counter designated as "not-a-trend" counter;
(8c7c) querying whether said "not-a-trend" counter value is greater than the value of TCL (Trend Counter Limit);
(8c7d) if "not-a-trend" counter is greater than the value of TCL (YES), then deleting all collected samples;
(8c7e) resuming operations at step (c1) of claim 1.

3. The method of claim 1 wherein step (c7) includes the steps of:
(9c7a) determining that the A*N value does not fall between "L" and "U";
(9c7b) querying whether the trend type is upward as pre-ordained in health policy specifications;
(9c7c) if the trend is upward, then querying whether A*N value is greater than the upper boundary "U"; and if so;
(9c7d) determining whether the common sense value "C" is greater than the upper boundary value "U"; and if so,
(9c7e) calculating the size of the increase (Delta I) which indicates the average value of the sample set multiplied by the number of data points in the set multiplied by the first value in the set;
(9c7f) incrementing a trend counter and zeroing out said "not-a-trend" counter;
(9c7g) checking to see if said trend counter value is greater than the trend counter limit value (TCL); and if so,
(9c7h) reporting an upward trend to said Client-User;
(9c7i) additionally smoothing out the data collected by using reported values below the lower boundary "L" to offset reported values above the upper boundary "U" to eliminate spikes and false alerts.

4. The method of claim 1 wherein step (c7) includes the steps of:
(10c7a) determining that the A*N value does not fall between "L" and "U";
(10c7b) querying whether the trend type is downward as specified in health policy specifications;
(10c7c) if the trend is downward, then querying whether A*N value is less than the lower boundary "L"; and if so,
(10c7d) determining whether the common sense value "C" is less than the lower boundary value "L", and if so,
(10c7e) calculating the size of the decrease (Delta D) which indicates the absolute average value of the sample set multiplied by the number of data points in the set multiplied by the first value in the set;
(10c7f) incrementing a trend counter and zeroing out said "not-a-trend" counter;
(10c7g) checking to see if said trend counter value is greater than the trend counter limit value (TCL); and if so,
(10c7h) reporting a downward trend to said Client-User;
(10c7i) additionally smoothing out the data collected by using reported values above the upper boundary "U" to offset reported values below the lower boundary value "L" to eliminate spikes and false alerts.

5. In a multi-processor network holding multiple numbers of "local systems" which monitor themselves to create a collection of health events and predictive events and which include operating policies (P) to be effectuated a system for sensing future trends which predict future problems which may occur in system resources comprising:
(a) means to initialize an algorithm for a specified health trend policy;
(b) means to collect a sample set of data points using a counter at X points in a time interval sampling period;
(c) means for calculating a value which represents the general increase or decrease in the allocation-utilization of a monitored resource;
(d) means for calculating the average "A" percent difference of the values in the current sample set;
(e) means to determine that the value "A" falls between a low boundary value "L" and an upper boundary value "U" for the selected policy involved;
(f) means to utilize a trend counter limit (TCL) to determine if the number of collected sample sets exceeds the TCL value, and, if so;
(g) means to indicate that the value of the monitored health index for that resource is in a "steady state" and there is no trend involved.

6. The system of claim 5 wherein said means for calculating (d) includes:
(13d1) means to recognize that said value "A" indicates that the value "A" is outside the upper "U" and lower "L" boundary set for the selected policy (P) and said policy is monitoring for an upward trend;
(13d2) means to recognize that said value "A" is above the upper boundary value "U" and also a common sense value indicates the first data point is below the last data point (upward trend).

7. The system of claim 5 wherein said means for calculating (d) includes:
(14d1) means for determining if the average percent difference "A" is equal to or less than both the upper boundary "U" and the lower boundary "L" for the selected policy (P); and, if so;
(14d2) means for calculating the downward movement (Delta D) by multiplying "A" by the first value in the sample set to get an estimated data point;
(14d3) means for indicating a downward trend.

8. The system of claim 7 wherein each means (14d3) for indicating a trend includes:
(14d3a) means for smoothing out data points in said sample set which involve inadvertent spikes in value.

* * * * *